United States Patent [19]
Korzhov et al.

[11] 4,237,848
[45] Dec. 9, 1980

[54] ROTARY-PISTON INTERNAL COMBUSTION ENGINE

[76] Inventors: Mikhail A. Korzhov, ulitsa Banykina, 6, kv. 18; Leonid N. Novikov, Leninsky prospekt, 40, kv. 342; Vyacheslav N. Makarov, prospekt Stepana Razina, 21, kv. 164; Olga L. Onkova, bulvar Baumana, 8, kv. 42; Vladimir V. Mishunin, ulitsa Jubileinaya, 1/57, kv. 77; Vladimir I. Usenko, ulitsa Voroshilova, 30, kv. 14; Alexandr F. Bendersky, Moskovsky prospekt, 33, kv. 265, all of Tolyatti Kuibyshevskoi oblasti, U.S.S.R.

[21] Appl. No.: 31,014

[22] Filed: Apr. 17, 1979

[51] Int. Cl.³ ............................................. F02B 53/00
[52] U.S. Cl. ..................................... 123/242; 418/85; 418/88
[58] Field of Search ................... 123/242; 418/85, 88, 418/97, 99

[56] References Cited

U.S. PATENT DOCUMENTS

| | | | |
|---|---|---|---|
| 3,819,304 | 6/1974 | Demers | 418/88 X |
| 3,841,803 | 10/1974 | Morgan et al. | 418/88 X |

FOREIGN PATENT DOCUMENTS 1214334  12/1970  United Kingdom ................. 123/242

*Primary Examiner*—Michael Koczo
*Attorney, Agent, or Firm*—J. Harold Nissen

[57] ABSTRACT

The rotary-piston internal combustion engine comprises a trochoidal working chamber with a vertical major axis, a rotor shaft mechanically coupled to a generator and a water pump mounted on the engine housing, an auxiliary drive shaft used for driving an oil pump communicating in series with a water-cooled oil radiator and oil filter, a fuel pump and a lubricator installed on the engine housing. The auxiliary drive shaft is inclined at an angle of 7 to 15 deg of arc in the direction of rotation of the rotor shaft with respect to the working chamber major axis so that the drive shaft geometrical axis intersects the major axis somewhat above the chamber uppermost point and its opposite ends are used to drive the lubricator and the oil pump installed at the respective extremities of the shaft.

2 Claims, 3 Drawing Figures

ROTARY-PISTON INTERNAL COMBUSTION ENGINE

The present invention relates to the engine-building industry and more particularly to a rotary-piston internal combustion engine.

The proposed engine can be used to advantage in cars. However, the proposed engine may be used as a power unit drive on other vehicles.

Known in the art is a rotary-piston internal combustion engine with a working chamber hollowed in a stator to form a curved inner contour within the engine housing. The engine rotor providing an inside envelope of the chamber rotates on an eccentric shaft. Mounted on the engine housing are the following engine auxiliary units: an ignition distributor, an oil pump, a fuel pump. These auxiliaries are operated from the drive shaft geared with the eccentric shaft. The oil pump and the ignition distributor are located at the respective extremities of the drive shaft. The oil pump is accommodated in a case located below the engine housing and at the side thereof. The auxiliary drive shaft is inclined so that the angle between the shaft and the vertical axis is much greater than that between the shaft and the horizontal line.

With the drive shaft disposed in the aforementioned manner the oil pump and the ignition distributor extend beyond the overall width of the engine housing, which is not convenient for installation of the engine in a car between the car body side walls and for carrying out maintenance operations inside the car engine compartment.

Also known in the prior art is a rotary-piston internal combustion engine with a trochoidal working chamber, in which the oil pump and oil sump are mounted beyond the engine housing at one side with the fuel feed system components, inlet and exhaust pipes installed at the other side of the engine.

Such an arrangement of the engine components also hinders installation of the rotary-piston engine in a car.

Besides, there is also known a rotary-piston engine (of the Wankel type) in which the auxiliary drive shaft is arranged parallel to the major axis of the trochoidal working chamber of the engine, being mechanically coupled to the engine rotor shaft. Located at one end of the drive shaft is an oil pump mounted in the oil sump case installed below the engine housing. The ignition distributor is mounted at the other end of the drive shaft. The fuel pump has its own drive shaft disposed square to the said drive shaft and geared with the engine rotor shaft.

The engine of this consruction is more advantageous as compared to those previously described as far as the arrangement of the auxiliary units relative to the engine housing is concerned, because it has a smaller overall width. However, provision of two drive shafts for auxiliary units and of an additional drive for the lubricator whose function is to lubricate the trochoidal surface of the working chamber makes the general configuration of the rotary-piston internal combustion engine too complicated.

It is an object of the present invention to provide a rotary-piston internal combustion engine, in which the auxiliary drive shaft and the auxiliary units proper are arranged so that the engine overall width is not greater than the respective overall dimension of a conventional engine equal in power.

Another object of the present invention is to insure more convenient servicing and maintenance of the engine auxiliary units.

Still another object of the present invention is to make the construction of a rotary-piston internal combustion engine simpler.

In accordance with these and other objects the invention resides in that in a rotary-piston internal combustion engine comprising a trochoidal working chamber whose major axis is vertical, a rotor shaft mechanically linked up with a generator and a water pump mounted on the engine housing, an auxiliary drive shaft for driving an oil pump communicating in series with a water-cooled oil radiator and an oil filter, a fuel pump and a lubricator installed on the housing of the engine, according to the invention, the auxiliary drive shaft is inclined in the direction of the rotor shaft rotation to the major axis of the working chamber at an angle of 7 to 15 deg or arc so that the drive shaft geometrical axis intersects the major axis of the working chamber somewhat above the chamber uppermost point, and the lubricator and oil pump are installed at the opposite extremities of the drive shaft, respectively.

Besides, in the proposed engine the water-cooled oil radiator adjoins the oil pump from the side of the major axis of the working chamber, being located below the oil filter in the immediate proximity thereto.

Such an arrangement of the water-cooled oil radiator makes shorter the route of lubricating oil from the oil pump to the oil filter and provides a more compact structure of the engine.

The overall width of the proposed rotary-piston internal combustion engine is substantially equal to that of a conventional piston engine of the same horsepower, which makes it possible to install the rotary-piston engine both in new production cars and those found in service. Moreover, these engines are simpler is construction and convenient in operation.

A specific embodiment of the present invention will now be described in detail, by way of example only, with reference to the accompanying drawings, in which.

Figure 1:
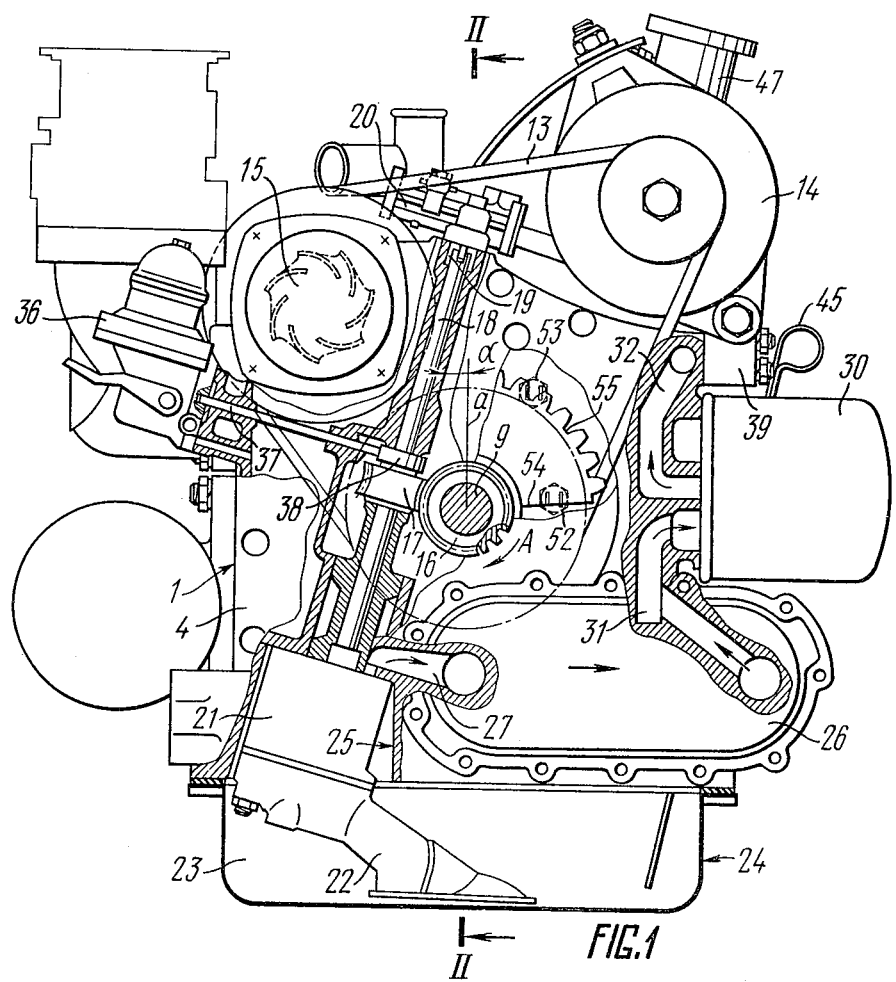
FIG. 1 shows a rotary-piston internal combustion engine in accordance with the present invention, front partially sectional view.

Referring now more specifically to FIG. 1, the rotary-piston internal combustion engine comprises a housing 1 consisting of a middle part 2 (FIG. 2), in which a working chamber 3 is formed, and three covers - a front cover 4 and two covers 5, adjacent to the middle part 2. The internal peripheral surface 6 (FIG. 3) of the working chamber 3 is trochoidal. The major axis "a" (FIG. 1) of the working chamber 3 (FIG. 2) is vertical, being actually the engine axis. Accommodated inside the part 2 is a rotor 7 rotatably mounted on the eccentric 8 of the shaft 9. The shaft 9 rides in the cover 5, adjacent to the middle part 2, mounted on bearings 10. Secured to the shaft 9 are a counterweight 11 and a pulley 12 connected through a V-belt drive 13 with a generator 14 (FIG. 1) and a water pump 15. Keyed on the shaft 9 is a gear 16 meshing with the gear 17 attached to the auxiliary drive shaft 18.

The drive shaft 18 is installed in the front cover 4 at an angle $\alpha$ (FIG. 1) to the major axis of the working chamber 3 (FIG. 2), being inclined in the direction A of rotation of the shaft 9 of the rotor 7 so that the drive shaft geometrical axis intersects the major axis "a" of the working chamber 3 somewhat above the trochoidal chamber uppermost point.

The inclination angle "α" of the drive shaft 18 is within 7–15 deg of arc relative to the major axis "a". The suggested inclination angle "α" within the specified range is optimum for automobile rotary-piston engines from the point of view of compact arrangement of the engine auxiliary units on the housing 1. Investigations of various engine configurations with regard to the arrangement of auxiliary units make it possible to conclude that any other disposition of the drive shaft 18 at an angle "α" outside of the proposed specified limits will result in an increase of the engine width, which will render it impossible to install the rotary-piston engine reasonably both in series-production and novel automobiles. This statement will hereinafter be confirmed in connection with the description of particular auxiliary units necessary for operation of the rotary-piston internal combustion engine.

Figure 2:
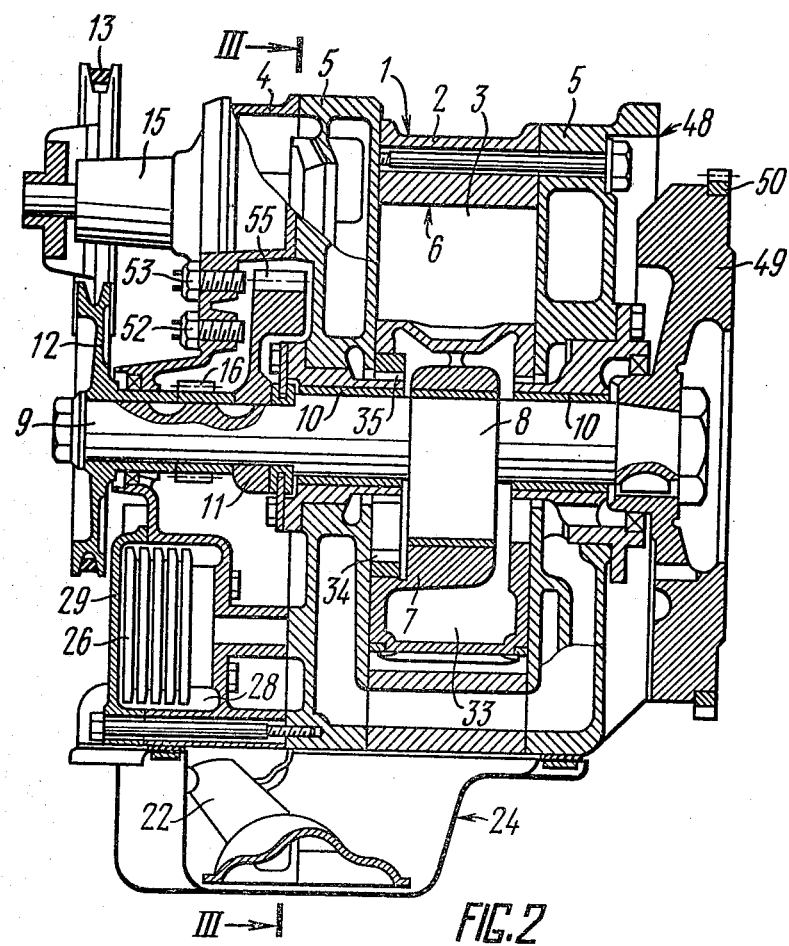
FIG. 2 is a section on line II—II of FIG. 1.
Figure 3:
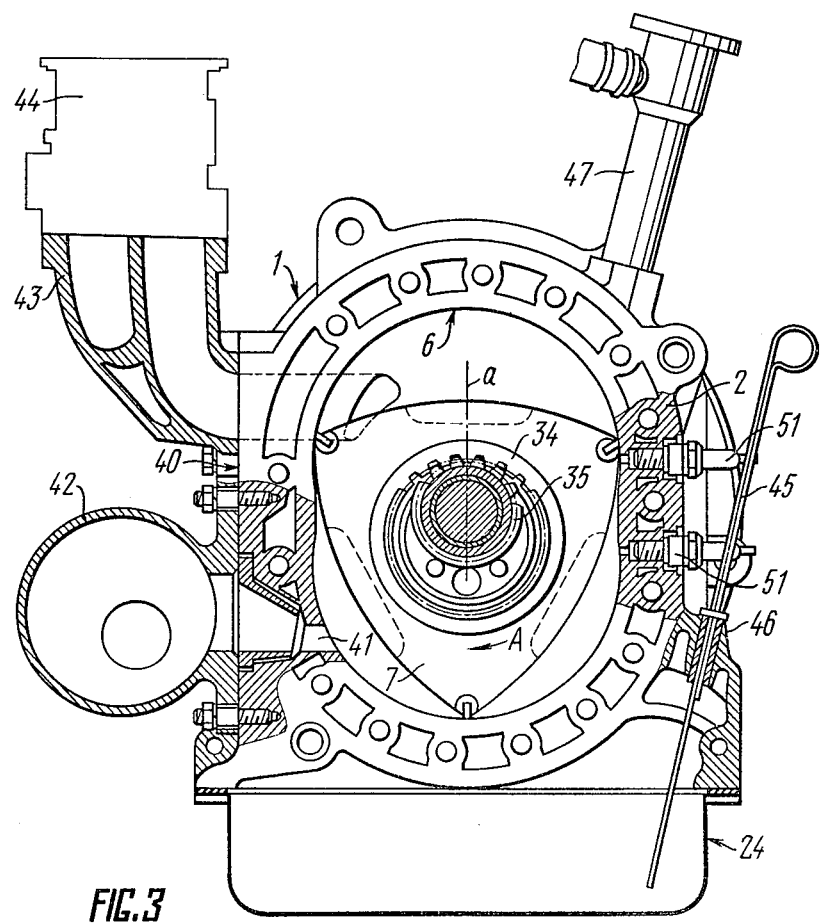
FIG. 3 is a section on line III—III of FIG. 2.

The upper end of the drive shaft 18 protruding in a recess 19 made in the front cover 4 engages with the lubricator 20. The function of the lubricator 20 is to lubricate the trochoidal surface 6 (FIG. 2) of the working chamber 3 during operation of the engine. The internal cavity of the lubricator 20 (FIG. 1) communicates with the working chamber 3 (FIG. 2).

Mounted at the lower end of the drive shaft 18 (FIG. 1) is an oil pump 21 whose suction pipe 22 is lowered into the oil cavity 23 of the oil sump case 24. The oil pump 21 is accommodated partially in a recess 25 hollowed in the front cover 4. Provision of this recess makes it possible to reduce the height of the oil cavity 23 of the case 24. The aforementioned angle "α" inclination of the drive shaft 18 relative to the major axis "a" selected to be within a range of from 7 to 15 deg of arc makes it possible to install the oil pump 21 of an existing type in the lower portion of the front cover 4 within the overall width of the housing 1.

Adjoining the oil pump 21 from the side of the major axis "a" is a water-cooled oil radiator 26 communicating with the oil pump 21 via a short pipe 27. The water-cooled oil radiator 26 is installed in a recess 28 (FIG. 2) hollowed in the front cover 4 and closed with a cover 29 at the front, just below the oil filter 30 (FIG. 1) connected with the radiator by a pipe 31. The horizontal axes of the water-cooled oil radiator 26 and of the oil filter 30 are substantially square to the major axis "a".

The angle "α" selected within the specified limits to define inclination of the drive shaft 18 relative to the major axis "a" allows the water-cooled oil radiator 26 to be arranged almost within the outlines of the front cover 4 of the engine, thereby reducing its overall dimensions to minimum. Any reduction of the angle "α" will be followed by a displacement of the water-cooled oil radiator 26 outside of the housing 1 and by an extension of the pipe 31. In addition, the suggested arrangement of the water-cooled oil radiator 26 makes the route of lubricating oil from the oil pump 21 to the oil filter 30 as short as possible. The oil outlet pipe 32 adjoining the oil filter 30 is used to convey clean oil for oiling the bearings 10 (FIG. 2) and to the interior cavity 33 (FIG. 2) of the rotor 7 to cool the latter.

To synchronize rotation of the rotor 7 (FIG. 3), provision is made of a synchronizer comprising a gear 34 secured to the rotor 7 and a gear 35 attached to the cover 5.

A gasoline fuel pump 36 is mounted near the water pump 15 on a side mounting pad provided on the front cover 4 above the oil pump 21 (FIG. 1). The gasoline pump 36 is actuated by a push rod 37 and a cam 38 provided on the drive shaft in the immediate vicinity to the gear 17. Disposed between the gasoline pump 36 and lubricator 20 is a water pump 15. The generator 14 is mounted on a bracket 39 near the lubricator 20 on the other side from the major axis "a". Mounted on a mounting pad 40 (FIG. 3) which is the first one in the direction of rotation of the rotor 7 pointed out by the arrow A, is an exhaust system comprising a duct 41 and an afterburner 42. To supply fuel-air mixture into the engine, provision is made of an induction system comprising an inlet pipe 43 and carburetor 44 fastened to the pipe.

The oil level in the oil sump case 24 is measured by means of a dip stick 45 inserted through the hole in a boss 46 provided at the left-hand side of the engine cover 5. Press-fitted into the rear cover 5 (FIG. 2) at the top is an oil filler pipe 47 (FIG. 3) intended to pour oil into the engine. A mounting pad 48 (FIG. 2) is provided on the rear cover 5 for installation of a clutch housing. A flywheel 49 provided with a ring gear 50 and used as the driving disk of the clutch is keyed on the shaft 9.

Ignition plugs 51 (FIG. 3) are driven into the middle part 2 of the housing 1 from the side opposite to the side of installation of the fuel-air mixture induction system. To control the run of the ignition plugs 51, provision is made in the engine for a digit-type ignition system comprising an onset pickoff 52 (FIG. 2) and an angular displacement pickoff 53 installed in the engine front cover 4 just against the respective marks made on the counter-weight 11 for the purpose. FIG. 2 shows schematically the arrangement of the pickoffs 52 and 53. The onset pickoff 52 is installed against a mark 54 (FIG. 1) made on the counterweight 11 (FIG. 2). The mark 54 (FIG. 1) may be represented by a diametrically-milled groove or by a diametral edge or step on the counterweight surface. The angular displacement pickoff 53 is positioned opposite to the count marks 55 (FIG. 2) machined on the rim periphery of the counterweight 11.

The ignition plug timing control with the aid of the digit-type ignition system makes it possible to dispense with a mechanically driven ignition distributor in the rotary-piston internal combustion engine and to use the vacated end of the auxiliary drive shaft 18 for driving the lubricator 20.

The operating principle of the proposed rotary-piston internal combustion engine is well-known and is not described herein.

The proposed invention offers a possibility to simplify the construction of the engine and reduce its overall dimensions. For instance, the overall dimensions of a 70 hp rotary-piston internal combustion engine are as follows: length - 430 mm, width - 600 mm, height - 560 mm. Installation of the proposed engine in a car engine compartment makes it possible to make the best of the available compartment and to facilitate maintenance of the engine auxiliary units.

What is claimed is:

1. A rotary-piston internal combustion engine comprising: a housing; a trochoidal working chamber hollowed in said housing so that its major axis is vertical; a rotor accommodated within said working chamber; a rotor shaft installed in said housing; a generator and a water pump mounted on said housing and coupled mechanically to said rotor shaft; auxiliary units installed on said housing: an oil pump, a lubricator used for metering oil supplied into said working chamber to lubricate its internal surfaces and a fuel pump; an auxiliary drive shaft designed for driving said auxiliary units, mechanically geared with said rotor shaft and disposed in an inclined position in the direction of rotation of said rotor shaft at an angle of 7 to 15 deg of arc relative to the major axis of said working chamber so that its geometrical axis intersects the major axis of said working chamber somewhat above the chamber uppermost point; the ends of said auxiliary drive shaft used one for driving said oil pump, the other for driving said lubricator; a fuel pump actuated from said auxiliary drive shaft; a water-cooled oil radiator positioned on said housing; an oil filter installed on said housing, said oil pump, water-cooled oil radiator and oil filter being connected in series; a means for igniting fuel-air mixture in said working chamber.

2. A rotary-piston internal combustion engine according to claim 1, wherein the water-cooled oil radiator adjoins the oil pump at the side of the working chamber major axis, being positioned under the oil filter in the immediate proximity thereto.

* * * * *